(12) United States Patent
Yabe et al.

(10) Patent No.: US 9,496,759 B2
(45) Date of Patent: Nov. 15, 2016

(54) ROTOR OF INTERIOR PERMANENT MAGNET MOTOR, COMPRESSOR, AND REFRIGERATING AIR-CONDITIONING APPARATUS

(75) Inventors: Koji Yabe, Tokyo (JP); Kazuhiko Baba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 265 days.

(21) Appl. No.: 14/349,720

(22) PCT Filed: Oct. 24, 2011

(86) PCT No.: PCT/JP2011/074452
§ 371 (c)(1),
(2), (4) Date: Apr. 4, 2014

(87) PCT Pub. No.: WO2013/061397
PCT Pub. Date: May 2, 2013

(65) Prior Publication Data
US 2014/0232231 A1    Aug. 21, 2014

(51) Int. Cl.
*H02K 21/12* (2006.01)
*H02K 1/27* (2006.01)
*H02K 29/03* (2006.01)

(52) U.S. Cl.
CPC .............. *H02K 1/276* (2013.01); *H02K 29/03* (2013.01); *H02K 2213/03* (2013.01)

(58) Field of Classification Search
CPC .............. H02K 2213/03; H02K 1/276; H02K 1/2766

(Continued)

(56) References Cited

U.S. PATENT DOCUMENTS

| 7,282,827 | B2 | 10/2007 | Futami |
| 8,106,557 | B2* | 1/2012 | Yoshino ................ H02K 1/276 310/156.53 |

(Continued)

FOREIGN PATENT DOCUMENTS

| EP | 1670117 A1 | 6/2006 |
| JP | 2001-037127 A | 2/2001 |

(Continued)

OTHER PUBLICATIONS

Extended European Search Report issued on Dec. 9, 2015 in the corresponding EP Application No. 11874480.4.
Office Action issued Dec. 1, 2015 in the corresponding JP application No. 2014-264526 (with English translation).

(Continued)

*Primary Examiner* — Hanh Nguyen
(74) *Attorney, Agent, or Firm* — Posz Law Group, PLC

(57) ABSTRACT

A rotor of an interior permanent magnet motor includes a rotor core; permanent magnet insertion holes formed in an outer circumferential portion of the rotor core along a circumferential direction; a permanent-magnet end-portion air gap formed in each of both end portions of each permanent magnet insertion hole; a permanent magnet inserted in each permanent magnet insertion hole; and slits formed in an outer circumferential core portion on an outer side in a radial direction with respect to each permanent magnet insertion hole, wherein a width of a core present between the permanent-magnet end-portion air gap and the slit and a width of a core present between the slits are such that a width of a core gradually increases as the core is closer to a magnet pole center from the interpolar line.

14 Claims, 3 Drawing Sheets

(58) Field of Classification Search
USPC .................................................. 310/156.53
See application file for complete search history.

(56) References Cited

U.S. PATENT DOCUMENTS

| | | |
|---|---|---|
| 2006/0273678 A1 | 12/2006 | Futami |
| 2008/0018190 A1 | 1/2008 | Takahata et al. |
| 2008/0224558 A1* | 9/2008 | Ionel .................... H02K 1/2766 310/156.57 |
| 2010/0244609 A1 | 9/2010 | Takahata et al. |
| 2012/0242182 A1 | 9/2012 | Yabe et al. |
| 2013/0140922 A1* | 6/2013 | Yabe .................... H02K 1/2706 310/51 |

FOREIGN PATENT DOCUMENTS

| | | |
|---|---|---|
| JP | 2005-094968 A | 4/2005 |
| JP | 2008-029095 A | 2/2008 |
| JP | 2008-167583 A | 7/2008 |
| JP | 2008-187778 A | 8/2008 |
| JP | 2008-245384 A | 10/2008 |
| JP | 2009-071934 A | 4/2009 |
| JP | 2011-114927 A | 6/2011 |
| WO | 2011/096094 A1 | 8/2011 |

OTHER PUBLICATIONS

International Search Report of the International Searching Authority mailed Jan. 31, 2012 for the corresponding international application No. PCT/JP2011/074452 (with English translation).

* cited by examiner

US 9,496,759 B2

ROTOR OF INTERIOR PERMANENT MAGNET MOTOR, COMPRESSOR, AND REFRIGERATING AIR-CONDITIONING APPARATUS

CROSS REFERENCE TO RELATED APPLICATION

This application is a U.S. national stage application of International Patent Application No. PCT/JP2011/074452 filed on Oct. 24, 2011.

TECHNICAL FIELD

The present invention relates to a rotor of an interior permanent magnet motor, a compressor that includes the rotor, and a refrigerating air-conditioning apparatus that includes the compressor.

BACKGROUND

Conventionally, rotors of interior permanent magnet motors configured as described below have been proposed. Specifically, the rotor of the interior permanent magnet motor includes a rotor core that is formed by laminating a plurality of magnetic steel sheets; permanent magnet insertion holes that are formed in an axial direction of the rotor core and are formed in portions corresponding to the sides of a substantially regular polygon centered on the axial center; permanent magnets that are inserted into the permanent magnet insertion holes; a plurality of slits that are formed in a core portion on the outer circumferential side with respect to the permanent magnet insertion holes and are spaced apart along the permanent magnet insertion holes; and outer-side thin portions that are provided between outer side ends of the slits in a radial direction and an outer circumference of the rotor core and each gradually increases its width in the radial direction toward interpolar portions from a magnetic pole center. With such a configuration, the harmonics of the induced voltage and cogging torque can be reduced by reducing the harmonic components of the magnetic flux density waveform in the interpolar portions (for example, see Patent Literature 1).

CITATION LIST

Patent Literature

Patent Literature 1: Japanese Patent Application Laid-open 2008-167583

Technical Problem

The slit shapes in the rotor of the conventional interior permanent magnet motor described in Patent Literature 1 are such that the width of each of the outer-side thin portions in the radial direction gradually increases toward the interpolar portions from the magnetic pole center and such slit shapes reduce the harmonics of the induced voltage.

However, it is desirable to further reduce the harmonics of the induced voltage and improve torque ripple and noise.

SUMMARY

The present invention has been achieved in view of the above and an object of the present invention is to provide a rotor of an interior permanent magnet motor that can reduce torque ripple by reducing the harmonics of the induced voltage, a compressor that includes the rotor, and a refrigerating air-conditioning apparatus that includes the compressor.

In order to solve the above problems and achieve the object, a rotor of an interior permanent magnet motor according to the present invention includes a rotor core; a plurality of permanent magnet insertion holes that are formed in an outer circumferential portion of the rotor core along a circumferential direction; a permanent-magnet end-portion air gap that is formed in each of both end portions of each of the permanent magnet insertion holes; a permanent magnet that is inserted in each of the permanent magnet insertion holes; and a plurality of slits that are formed in a core portion that is on an outer side in a radial direction with respect to each of the permanent magnet insertion holes, wherein three or more of the slits are present in an angular range of 360/(number of poles×3) degrees from an interpolar line, which is between magnetic poles of adjacent permanent magnets, and a width of a core present between the permanent-magnet end-portion air gap and the slit and a width of a core present between adjacent slits are such that a width of a core gradually increases as the core is closer to a magnet pole center from the interpolar line.

According to the present invention, an effect is obtained where torque ripple can be reduced by reducing the harmonics of the induced voltage.

DETAILED DESCRIPTION

Exemplary embodiments of a rotor of an interior permanent magnet motor, a compressor, and a refrigerating air-conditioning apparatus according to the present invention will be explained below in detail with reference to the drawings. This invention is not limited to the embodiments.

Embodiment

Figure 1:
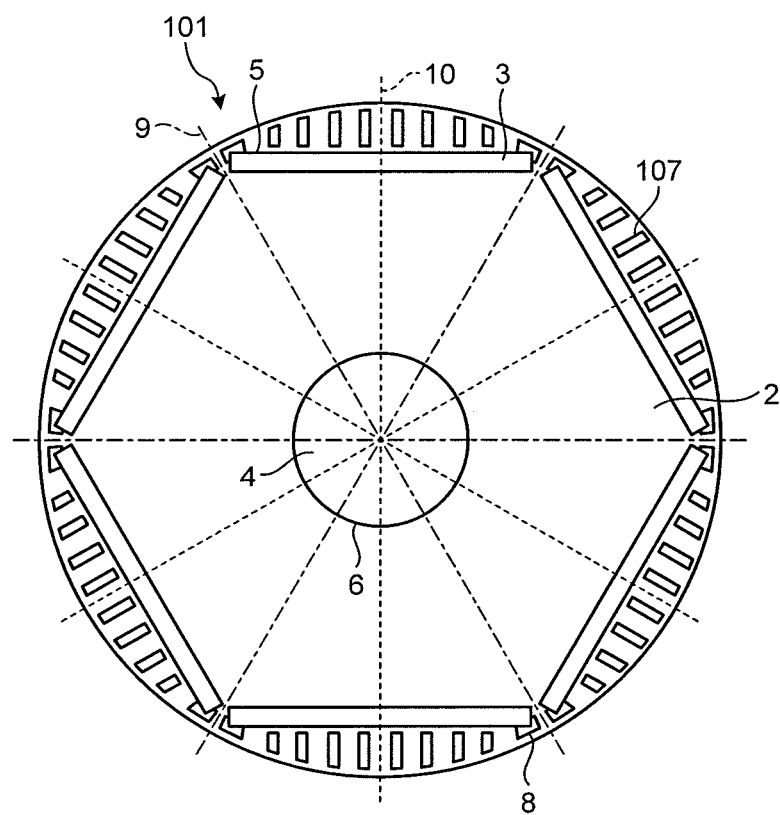
FIG. 1 is a diagram for comparison and is a transverse cross-sectional view of a rotor of an interior permanent magnet motor provided with typical slits.
Figure 2:
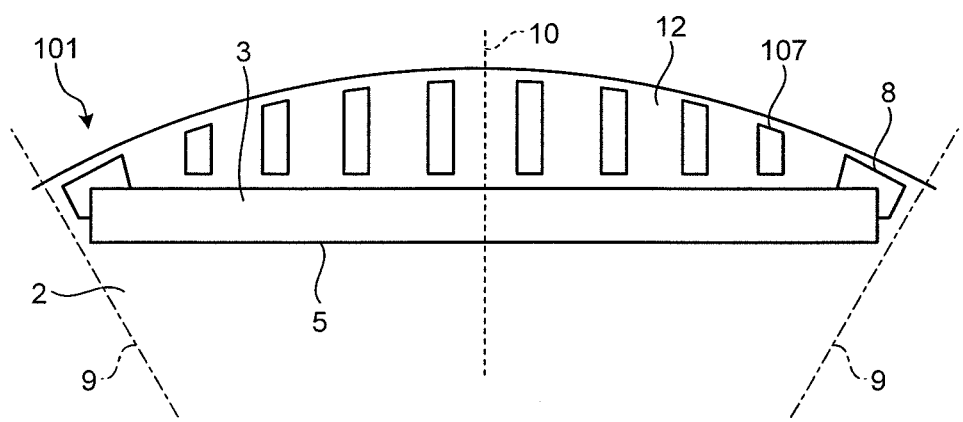
FIG. 2 is a diagram for comparison and is an enlarged view of a magnetic pole portion of the rotor of the interior permanent magnet motor provided with typical slits.

FIGS. 1 and 2 are diagrams for comparison. FIG. 1 is a transverse cross-sectional view of a rotor of an interior permanent magnet motor provided with typical slits and FIG. 2 is an enlarged view of a magnetic pole in FIG. 1.

First, a typical interior permanent magnet motor (brushless DC motor) will be explained with reference to FIG. 1 and FIG. 2. A rotor 101 of an interior permanent magnet motor provided with typical slits includes at least a rotor core 2, permanent magnets 3 embedded in the rotor core 2, and a rotating shaft 4 fixed to the rotor core 2. In the following, the rotor of the interior permanent magnet motor is, in some cases, simply referred to as a rotor.

The rotor core 2 has a substantially circular shape in transverse cross section and is formed by stamping out thin magnetic steel sheets (for example, non-oriented magnetic steel sheets with a thickness of about 0.1 to 1.0 mm (in which crystal orientations of the crystals are arranged as randomly as possible so as not to exhibit a magnetic property biased in a specific direction of the steel sheets) with a metal die to have a predetermined shape and laminating a predetermined number of (a plurality of) magnetic steel sheets together.

In the rotor core 2, a plurality of (for example, six in the drawings) permanent magnet insertion holes 5 each having, for example, a substantially rectangular shape in transverse cross section are formed, for example, at approximately equal intervals in the circumferential direction. In other words, a plurality of the permanent magnet insertion holes 5 are formed along the circumferential direction in the outer circumferential portion of the rotor core 2. Moreover, a shaft hole 6, into which the rotating shaft 4 is fitted, is formed in an approximately central portion of the rotor core 2. The plate-like permanent magnets 3 are inserted into the six permanent magnet insertion holes 5, respectively, and the six permanent magnets 3 are arranged such that N poles and S poles are alternately arranged in the circumferential direction, thereby configuring the rotor with six poles.

For the permanent magnets 3, for example, rare-earth permanent magnets mainly made from neodymium, iron, and boron, or the like are used.

A permanent-magnet end-portion air gap 8, which is connected to (communicates with) the permanent magnet insertion hole 5, is formed in each of both end portions of each of the permanent magnet insertion holes 5. The permanent-magnet end-portion air gaps 8 reduce leakage flux from the permanent magnets 3 at interpolar lines 9. The interpolar line 9 represents a part between magnetic poles of adjacent permanent magnets 3 (halfway between the magnetic poles) or a part between adjacent permanent magnet insertion holes 5. In contrast, a magnetic pole center 10 represents the center of the magnetic pole of each of the permanent magnets 3 in the circumferential direction or represents the center of each of the permanent magnet insertion holes 5 in the circumferential direction.

An outer circumferential core portion 12 is part of the outer circumferential portion of the rotor core 2 and is a core part on the outer side in the radial direction with respect to the permanent magnet insertion holes 5. In the outer circumferential core portion 12, a plurality of slits 107 are formed at predetermined intervals in the circumferential direction. In the rotor core 2, for each magnetic pole, for example, eight slits 107 are formed such that four slits 107 are on each of the right and left sides to be symmetrical about the magnetic pole center 10.

By providing the slits 107 in the outer circumferential core portion 12, the magnetic flux from the permanent magnets 3 can be controlled; therefore, it is possible to reduce torque ripple (torque pulsation).

This is due to the effect of the reduction of the harmonic components of the induced voltage and the reduction of cogging torque resulting from the presence of the slits 107.

As described above, according to the interior permanent magnet motor in which the rotor 101 illustrated in FIG. 1 is used, torque ripple can be reduced due to the effect of the slits 107; however, it is desirable to further reduce torque ripple so as to further reduce noise.

In the rotor 101 illustrated in FIG. 1, one factor contributing to degradation of torque ripple is that there is no optimization of the positions at which the slits 107 are arranged, the widths of the cores respectively present between the permanent-magnet end-portion air gaps 8 and the slits 107, and the widths of the cores respectively present between adjacent slits 107.

The slits 107 approximate the magnetic flux generated from the permanent magnets 3 to a sine wave and reduce the harmonic components of the induced voltage, thereby contributing to a reduction of cogging torque.

The induced voltage can be given by the time derivative of the magnetic flux interlinking a coil. When the magnetic flux density of the rotor outer circumferential portion is approximated to a sine wave, the harmonics of the induced voltage are reduced.

The induced voltage is given by differentiating the magnetic flux. This means that a change in magnetic flux is large in portions in which the induced voltage is the maximum and a change in magnetic flux is small in portions in which the induced voltage is near 0 volts.

The portions in which the induced voltage is near 0 volts are affected by the shape of the magnetic pole central portions in which a change in magnetic flux is small, and the portions in which the induced voltage is maximum are affected by the shape of the interpolar portions in which a change in magnetic flux is large.

As described above, the portions in which the induced voltage is maximum are affected by the shape of the interpolar portions in which a change in magnetic flux of the rotor 101 is large; therefore, it is necessary to cause the magnetic flux of the rotor outer circumference of the interpolar portions to change sinusoidally.

In other words, it is necessary to form the magnetic pole central portions and the interpolar portions such that magnetic flux increases from the interpolar portions toward the magnetic pole center.

However, even if the magnetic pole central portions and the interpolar portions are formed such that magnetic flux increases from the interpolar portions toward the magnetic pole center, because the magnetic pole central portions correspond to the portions in which the induced voltage is near 0 volts, it is desirable to reduce a change in magnetic flux in the magnetic pole central portions. Therefore, it is necessary to make the shape and arrangement of the slits 107 different between the portions near the interpolar portions and the portions near the magnetic pole center.

Therefore, the rotor outer circumference of each magnetic pole is divided into, for example, three regions and the shape and arrangement of the slits 107 are changed in accordance with each divided region, whereby slits near the interpolar portions and slits near the magnetic pole central portion can be appropriately arranged. The specific shape and arrangement of the slits will be described below.

Figure 3:
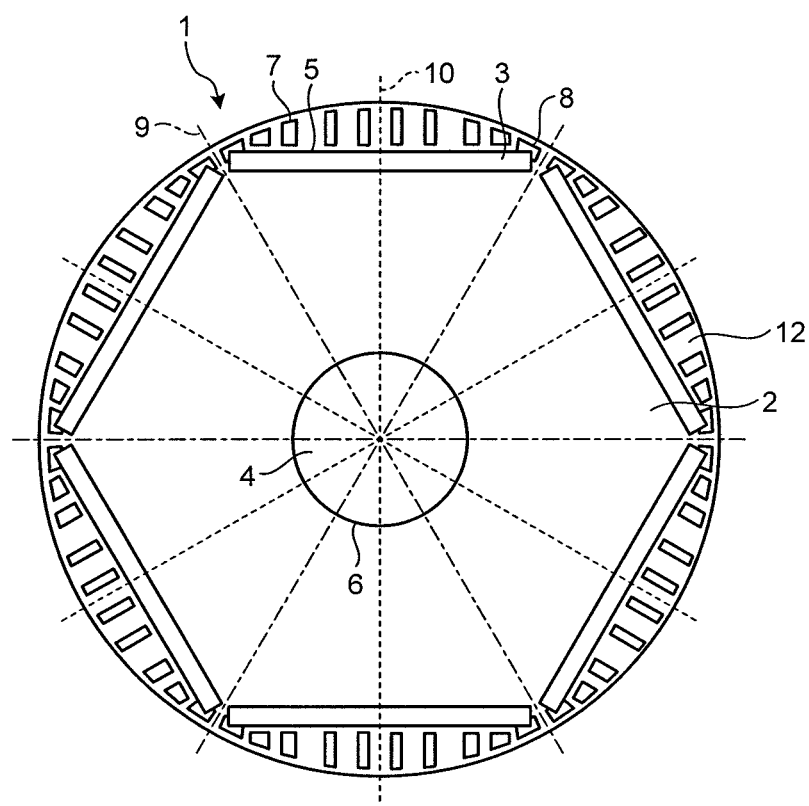
FIG. 3 is a transverse cross-sectional view of a rotor of an interior permanent magnet motor according to an embodiment.
Figure 4:
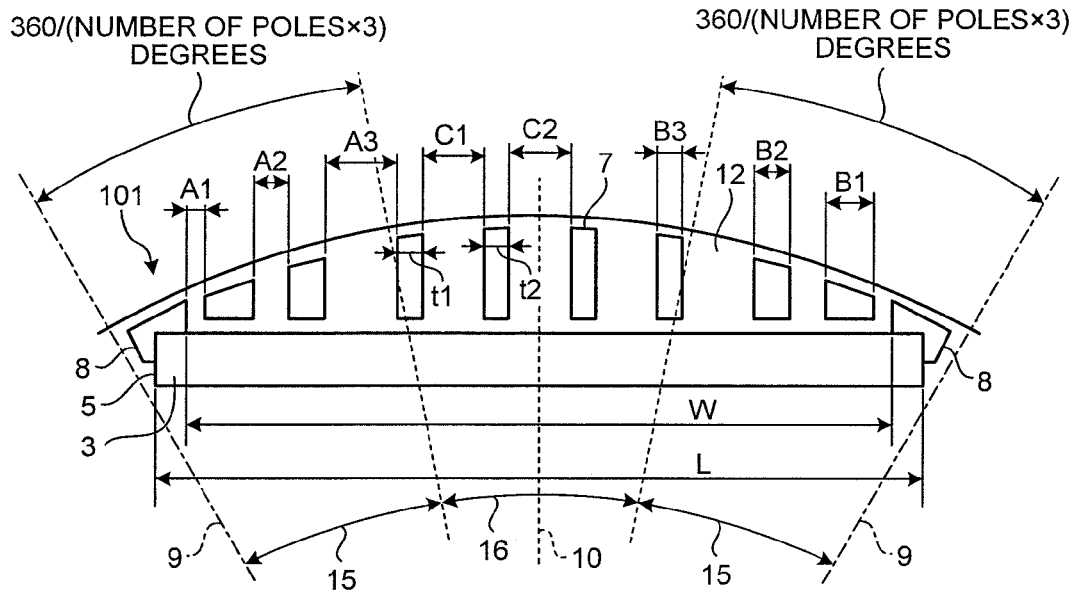
FIG. 4 is an enlarged view of a magnetic pole portion of the rotor of the interior permanent magnet motor according to the embodiment.

FIG. 3 is a transverse cross-sectional view of a rotor 1 of the interior permanent magnet motor according to the present embodiment and FIG. 4 is an enlarged view of a magnetic pole portion thereof.

The shape and arrangement of slits 7 will be explained with reference to FIG. 3 and FIG. 4. In the following, the same components as those in FIG. 1 and FIG. 2 are denoted by the same reference numerals and an explanation thereof is omitted, and an explanation will be given of the portions that are changed from those in FIG. 1 and FIG. 2.

As described above, each magnetic pole of the rotor 1 is divided into three regions, and the shape and arrangement of the slits 7 will be explained for each of the interpolar portions and the magnetic pole central portion. Specifically, as illustrated in FIG. 4, each magnetic pole of the rotor 1 is divided into three regions, and each region in an angular range of 360/(number of poles×3) degrees from the interpolar line 9 is defined as an interpolar portion 15 and a region on the magnetic pole center 10 side with respect to the interpolar portions 15 (i.e., a region in an angular range larger than 360/(number of poles×3) degrees from each of the interpolar lines 9) is defined as a magnetic pole central portion 16. Moreover, a core portion and the slit 7 at 360/(number of poles×3) degrees from each of the interpolar lines 9 are defined as a core portion and the slit 7 belonging to the corresponding interpolar portion 15.

The magnetic flux of the interpolar lines 9 is 0 T and it is necessary to gradually increase the magnetic flux toward the magnetic pole center 10. The magnetic flux depends on the size of a core near the rotor outer circumference. In other words, in order to gradually increase the magnetic flux of the interpolar portions 15, it is satisfactory that the size of a core in the rotor outer circumferential portion in each of the interpolar portions 15 gradually increases as the core is closer to the magnetic pole center 10.

In other words, in each of the interpolar portions 15, magnetic flux is increased by setting the width of the core present between the permanent-magnet end-portion air gap 8 and the slit 7 and the widths of the cores present between adjacent slits 7 such that the width of a core gradually increases as the core is closer to the magnetic pole center 10 from the corresponding interpolar line 9.

An explanation will be made with reference to FIG. 4. In each of the interpolar portions 15, the width of the core present between the permanent-magnet end-portion air gap 8 and the slit 7 and the widths of the cores present between adjacent slits 7 are respectively defined as A1, A2, and A3 in order from the side of the corresponding interpolar line 9. Therefore, when the relationship A1<A2<A3 is satisfied, magnetic flux can be increased from the interpolar line 9 toward the magnetic pole center 10. Accordingly, the harmonics of the induced voltage can be reduced and thus torque ripple and noise can be reduced. As illustrated in FIG. 4, the width of each core is the width in the circumferential direction (rotational direction).

Moreover, it is desirable that three or more slits 7 be present in each of the interpolar portions 15. When the number of the slits 7 is two, the magnetic flux of the rotor surface of each of the interpolar portions 15 can be expressed only at two points; therefore the magnetic flux increases linearly. It is preferable that the magnetic flux be represented by a sinusoidal curve, and when there are three or more slits 7, magnetic flux can be represented by a curve.

Next, an explanation will be given of the shape and arrangement of the slits 7 of the magnetic pole central portion 16. As described above, the magnetic pole central portion 16 indicates an angular range larger than 360/(number of magnetic poles×3) degrees from each of the interpolar lines 9. In other words, the magnetic pole central portion 16 is defined as a region in an angular range of 360/(number of magnetic poles×3) degrees that is sandwiched between a pair of the interpolar portions 15, each of which is an angular range of 360/(number of magnetic poles×3) degrees from the corresponding interpolar line 9 about the axial center of the rotating shaft 4.

The magnetic pole center 10 is a part at which the magnetic flux density is maximum and corresponds to a part at which the induced voltage is 0 volts. The induced voltage being 0 volts indicates that a change in magnetic flux is small, and it is desirable that a change in magnetic flux be gradual in the magnetic pole center 10.

A change in magnetic flux being made gradual indicates that the core portions present between adjacent slits 7 are made to have approximately the same width, thereby making a change in magnetic flux gradual.

Accordingly, in the present embodiment, a change in magnetic flux of the magnetic pole central portion 16 can be made gradual by setting the width of the core on the most magnetic pole center 10 side among the cores present between adjacent slits 7 in each of the interpolar portions 15 (angular range of 360/(number of magnetic poles×3) degrees from each of the interpolar lines 9) equal to or more than the widths of the cores present between adjacent slits 7 in the magnetic pole central portion 16 and equal to or less than the interval between the centers of adjacent slits 7 in the magnetic pole central portion 16.

The above description will be explained with reference to FIG. 4. When the width of the core on the most magnetic pole center 10 side among the cores present between adjacent slits 7 in each of the interpolar portions 15 (angular range of 360/(number of magnetic poles×3) degrees from each of the interpolar lines 9) is A3, the widths of the cores present between adjacent slits 7 in the magnetic pole central portion 16 are C1 and C2, and the slit widths in the magnetic pole central portion 16 are t1 and t2, if $C1 \leq A3 \leq C1+t1/2+t2/2$ and $C2 \leq A3 \leq C2+t2/2+t2/2$ are satisfied, a change in magnetic flux of the magnetic pole central portion 16 can be made gradual and thus the harmonics of the induced voltage can be reduced.

Next, an explanation will be given of the width of the permanent magnets 3 in the circumferential direction. As described above, in each of the interpolar portions 15, the magnetic flux toward the magnetic pole center 10 from the corresponding interpolar line 9 is increased by setting the width of the core present between the permanent-magnet end-portion air gap 8 and the slit 7 and the widths of the cores present between adjacent slits 7 such that the width of a core gradually increases as the core is closer to the magnetic pole center 10 from the corresponding interpolar line 9, which is effective particularly when the magnetic force of the permanent magnets 3 flows evenly into the rotor surface.

In other words, there is a correlation between magnetic flux and the width of the permanent magnets 3. In the following, the width of the permanent magnets 3 means the width in the circumferential direction. When the width L of the permanent magnet 3 illustrated in FIG. 4 is smaller than the width W between a pair of the permanent-magnet end-portion air gaps 8 that face each other with the permanent magnet 3 therebetween (L<W), even if the widths of the cores present between adjacent slits 7 in each of the interpolar portions 15 are such that the width of a core gradually increases as the core is closer to the magnetic pole center 10 from the interpolar line 9, because the widths of the cores in a portion in which the permanent magnet 3 is not present is adjusted, magnetic flux cannot be sufficiently adjusted and thus it is difficult to obtain a sufficient effect. The width W between a pair of the permanent-magnet end-portion air gaps 8 specifically means the interval between the ends, which face each other, of a pair of the permanent-magnet end-portion air gaps 8 arranged with the permanent magnet 3 therebetween. In other words, the width W means the interval between the end of one permanent-magnet end-portion air gap 8 on the other permanent-magnet end-portion air gap 8 side and the end of the other permanent-magnet end-portion air gap 8 on one permanent-magnet end-portion air gap 8 side.

In other words, when the width L of the permanent magnet 3 is larger than the width W between a pair of the permanent-magnet end-portion air gaps 8 (L>W), magnetic flux can be sufficiently adjusted and thus a sufficient effect can be obtained.

Next, an explanation will be given of the widths of the slits 7 in the circumferential direction. In the following, the width of each of the slits 7 means the width in the circumferential direction.

Because the slits 7 are formed of air gaps, the slits 7 have a large effect on the flow of magnetic flux. Therefore, the harmonic components of the induced voltage can be reduced by adjusting the widths of the slits 7.

As described above, it is preferable that the magnetic flux of each of the interpolar portions 15 gradually increase toward the magnetic pole center 10. Because magnetic flux can easily flow in core portions, it is preferable that its width be gradually increased. However, because the slits 7 are formed of air gaps, magnetic flux does not flow easily. Therefore, if the slits 7 are increased in width, magnetic flux decreases.

In other words, in order to gradually increase the magnetic flux of each of the interpolar portions 15 toward the magnetic pole center 10 from the corresponding interpolar line 9, it is preferable that the slits 7 be gradually reduced in width contrary to the cores. Referring to FIG. 4, if the widths of the slits 7 in each of the interpolar portions 15 are respectively defined as B1, B2, and B3 in order from the corresponding interpolar line 9, it is preferable to satisfy the relationship B1>B2>B3.

Moreover, in the magnetic pole central portion 16, because it is desirable that a change in magnetic flux be gradual, the slits 7 can be made to have approximately the same width as each other. Furthermore, a change in magnetic flux of the magnetic pole central portion 16 becomes gradual by making the width of the slits 7 in the magnetic pole central portion 16 equal to the width of the slit 7 on the most magnetic pole center 10 side in each of the interpolar portions 15; therefore, the harmonic components of the induced voltage can be reduced. When this is explained with reference to FIG. 4, t1 becomes equal to t2.

Figure 5:
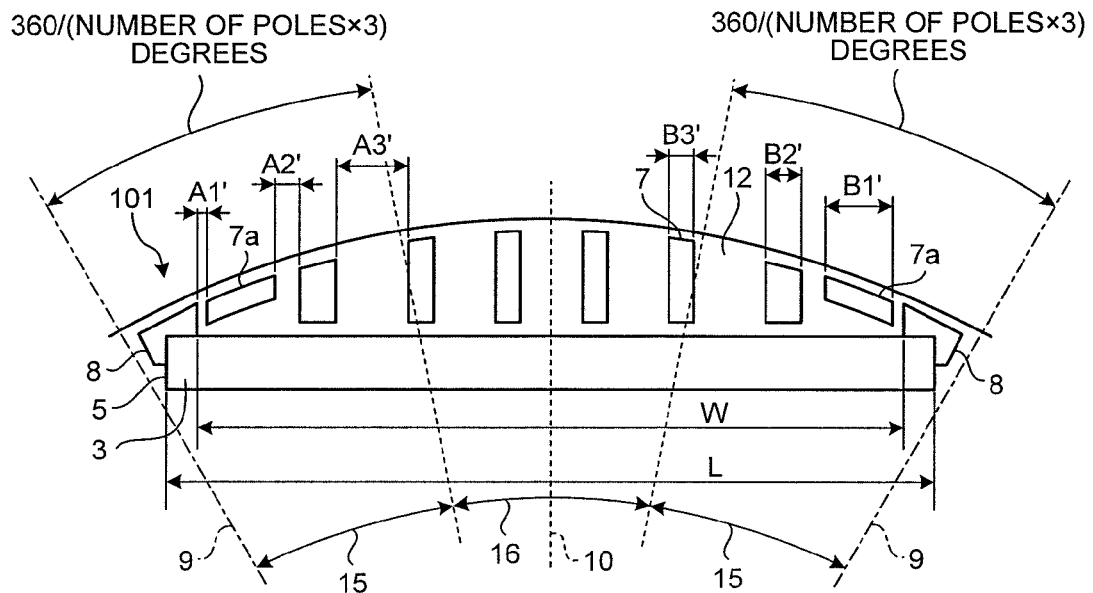
FIG. 5 is an enlarged view of a magnetic pole portion of a rotor of an interior permanent magnet motor according to a modified example of the embodiment.

FIG. 5 is an enlarged view of a magnetic pole portion of a rotor of an interior permanent magnet motor according to a modified example of the present embodiment. In FIG. 5, a slit 7a closest to each of the interpolar lines 9 has an elongated shape in the rotational direction (circumferential direction). In other words, while other slits are long in the radial direction, the slit 7a is long in the rotational direction (circumferential direction).

In FIG. 5, in each of the interpolar portions 15, the width of the core present between the permanent-magnet end-portion air gap 8 and the slit 7a is defined as A1' and the widths of the cores present between the slits 7 that are present on the magnetic pole center 10 side with respect to the core present between the permanent-magnet end-portion air gap 8 and the slit 7a are respectively defined as A2' and A3' in order, and the relationship A1'<A2'<A3' is satisfied as described above. Magnetic flux is determined by a core portion having the smallest width and the core portion having the smallest width is formed by the slit 7a, which is long in the rotational direction (circumferential direction), and the permanent-magnet end-portion air gap 8.

Moreover, in FIG. 5, in each of the interpolar portions 15, the width of the slit 7a is defined as B1' and the widths of the slits 7 on the magnetic pole center 10 side with respect to the slit 7a are respectively defined as B2' and B3' in order, and the relationship B3'<B2'<B1' is satisfied as described above. As illustrated in FIG. 5, the width B1' of the slit 7a is the size in the circumferential direction (rotational direction).

Effects of the present embodiment will be explained. According to the present embodiment, the harmonic components of the induced voltage can be reduced and thus torque ripple can be reduced; therefore, the low-noise rotor 1 can be configured. Moreover, the harmonic iron loss is also reduced by reducing the harmonic components of the induced voltage; therefore, the highly efficient rotor 1 can be configured.

Moreover, according to the present embodiment, because the low-vibration rotor 1 can be configured by reducing torque ripple, the rotor 1 with a long life can be obtained.

In the magnetic pole central portion 16, magnetic flux is large; therefore, it is preferable that the slits 7 be arranged to extend substantially vertically with respect to the permanent magnet 3. If the slits 7 do not extend substantially vertically with respect to the permanent magnet 3 (in this case, the slits 7 are not parallel to each other), the size between the slits 7 does not become uniform and gradually decreases and thus the magnetic flux density increases. Therefore, magnetic saturation occurs, which causes a reduction in the induced voltage.

In contrast, when the slits 7 are arranged substantially vertically with respect to the permanent magnet 3, the magnetic flux density between the slits 7 becomes constant; therefore, magnetic saturation does not occur and thus the efficiency does not decrease due to magnetic saturation. Thus, the highly efficient rotor 1 can be obtained.

Moreover, in the present embodiment, the number of magnetic poles of the rotor 1 is, for example, six; however, even if the number of magnetic poles is other than six, the present embodiment is definitely applicable. In such a case, similar effects can be obtained. Specifically, by applying the present embodiment to the rotor in which the number of magnetic poles is other than six, the induced voltage is improved and thus the effect of armature reaction is suppressed, and torque ripple can be reduced. Thus, a highly efficient and low-noise rotor can be configured.

Moreover, the interior permanent magnet motor is configured by arranging the rotor 1 to face the inner circumferential side of the stator (not illustrated); however, because the above effect is an effect of reducing torque ripple by the rotor 1, this effect can be obtained regardless of the configuration of the stator (not illustrated), such as the number of slots, the winding method (concentrated winding and distributed winding), and the number of magnetic poles.

Moreover, for example, when a sintered rare-earth magnet is used for the permanent magnets 3, because a sintered rare-earth magnet has a strong magnetic force, the magnetic flux density of the rotor 1 becomes large compared with the case where other types of magnets are used. Therefore, the effect of the slits 7 on the magnetic flux increases. Thus, when a sintered rare-earth magnet is used for the rotor 1, the present embodiment is more effective.

A compressor according to the present embodiment is a compressor that includes the rotor 1. In other words, a highly efficient and low-noise compressor can be configured by using the motor in which the rotor 1 according to the present embodiment is used with the compressor.

A refrigerating air-conditioning apparatus according to the present embodiment is a refrigerating air-conditioning apparatus that includes the compressor described above. In other words, a highly efficient and low-noise refrigerating air-conditioning apparatus can be configured by using the compressor that includes the motor in which the rotor 1 according to the present embodiment is used with the refrigerating air-conditioning apparatus.

INDUSTRIAL APPLICABILITY

As described above, the present invention is useful as a rotor of an interior permanent magnet motor, a compressor in which the rotor is used for an interior permanent magnet motor, and a refrigerating air-conditioning apparatus on which the compressor is mounted.

The invention claimed is:

1. A rotor of an interior permanent magnet motor comprising:
    a rotor core;
    a plurality of permanent magnet insertion holes that are formed in an outer circumferential portion of the rotor core along a circumferential direction;
    a permanent-magnet end-portion air gap that is formed in each of both end portions of each of the permanent magnet insertion holes;
    a permanent magnet that is inserted in each of the permanent magnet insertion holes; and
    a plurality of slits that are formed in an outer circumferential core portion that is on an outer side in a radial direction with respect to each of the permanent magnet insertion holes, wherein
    between adjacent interpolar lines which are adjacent to each other,
        in each angular range of 360/(number of poles×3) degrees from each of the adjacent interpolar lines:
            a width of a core present between the permanent-magnet end-portion air gap and a slit of the plurality of slits which is adjacent to the permanent-magnet end-portion air gap and a width of a core present between adjacent slits of the plurality of slits which are adjacent to each other in said each angular range of 360/(number of poles/3) degrees from the interpolar line are such that the width of a core gradually increases as the core is closer to a magnet pole center from the interpolar line, the magnet pole center being between the adjacent interpolar lines, and
            a width of the core present between the adjacent slits on a most magnetic pole center side of said each angular range of 360/(number of poles×3) degrees from each of the adjacent interpolar lines, is equal to or larger than a width of a core between adjacent slits that is present between the adjacent interpolar lines in an angular range larger than 360/(number of poles×3) degrees from both of the adjacent interpolar lines,
    the number of poles being a total number of poles in the rotor.

2. The rotor of an interior permanent magnet motor according to claim 1, wherein the width of the core on the most magnetic pole center side, which is present between the adjacent slits in said each angular range of 360/(number of poles×3) degrees from each of the adjacent interpolar lines, is equal to or smaller than an interval between centers of the adjacent slits that define a width of the core present in the angular range larger than 360/(number of poles×3) degrees from both of the adjacent interpolar lines.

3. The rotor of an interior permanent magnet motor according to claim 1, wherein an interval between ends, which face each other, of a pair of the permanent-magnet end-portion air gaps arranged with the permanent magnet therebetween is smaller than a width of the permanent magnet in a circumferential direction.

4. The rotor of an interior permanent magnet motor according to claim 1, wherein a slit width in a circumferential direction of the slit present in each angular range of 360/(number of poles×3) degrees from each of the adjacent interpolar lines gradually decreases as the slit is closer to the magnet pole center from the interpolar line.

5. The rotor of an interior permanent magnet motor according to claim 1, wherein slit widths in a circumferential direction of the slits present in each angular range larger than 360/(number of poles×3) degrees from both of the adjacent interpolar lines are equal to each other.

6. The rotor of an interior permanent magnet motor according to claim 5, wherein a slit width in a circumferential direction of the slit present in an angular range larger than 360/(number of poles×3) degrees from both of the adjacent interpolar lines is equal to a slit width in a circumferential direction of the slit on the most magnetic pole center side, which is present in each angular region of 360/(number of poles×3) degrees from each of the adjacent interpolar lines.

7. A compressor comprising the rotor of an interior permanent magnet motor according to claim 1.

8. A refrigerating air-conditioning apparatus comprising the compressor according to claim 7.

9. The rotor of an interior permanent magnet motor according to claim 1, wherein three or more of the slits are at least partially present in each angular range of 360/(number of poles×3) degrees from each of the adjacent interpolar lines, which is between magnetic poles of adjacent permanent magnets.

10. The rotor of an interior permanent magnet motor according to claim 1, wherein the plurality of slits in the angular range larger than 360/(number of poles×3) degrees from both of the adjacent interpolar lines are arranged to extend substantially parallel to each other and substantially vertically with respect to the permanent magnet.

11. The rotor of an interior permanent magnet motor according to claim 10, wherein three or more of the slits are at least partially present in each angular range of 360/(number of poles×3) degrees from each of the adjacent interpolar lines, which is between magnetic poles of adjacent permanent magnets.

12. The rotor of an interior permanent magnet motor according to claim 10, wherein, of the plurality of slits present between the adjacent interpolar lines, three or more of the plurality of slits are disposed at least partially in the angular range which is larger than 360/(number of poles×3) degrees from both of the adjacent interpolar lines.

13. The rotor of an interior permanent magnet motor according to claim 1, wherein from among the plurality of slits in the angular range larger than 360/(number of poles× 3) degrees from both of the adjacent interpolar lines, a slit closest to the interpolar line has a shape elongated in a circumferential direction of the rotor core.

14. The rotor of an interior permanent magnet motor according to claim 1, wherein, of the plurality of slits present between the adjacent interpolar lines, all of the plurality of slits are arranged to extend substantially parallel to each other and substantially vertically with respect to the permanent magnet.

* * * * *